United States Patent
Sendonaris (10) Patent No.: US 6,940,894 B2
(45) Date of Patent: Sep. 6, 2005

(54) POWER ESTIMATION USING WEIGHTED SUM OF PILOT AND NON-PILOT SYMBOLS

(75) Inventor: Andrew Sendonaris, San Jose, CA (US)

(73) Assignee: Qualcomm Incorporated, San Diego, CA (US)

( * ) Notice: Subject to any disclaimer, the term of this patent is extended or adjusted under 35 U.S.C. 154(b) by 792 days.

(21) Appl. No.: 10/010,586

(22) Filed: Nov. 8, 2001

(65) Prior Publication Data

US 2003/0087660 A1 May 8, 2003

(51) Int. Cl.[7] .......................... H04B 1/69; H04B 1/707; H04B 1/713
(52) U.S. Cl. ...................... 375/140; 370/318; 370/319; 370/328; 375/130; 375/140; 375/141; 375/260; 375/285; 375/296; 375/343; 375/367; 455/522
(58) Field of Search ................................ 370/318, 319, 370/328; 375/130, 140, 141, 260, 285, 296, 343, 367; 455/522

(56) References Cited

U.S. PATENT DOCUMENTS

| 5,412,686 A | * | 5/1995 | Ling .......................... 375/147 |
| 6,070,086 A | | 5/2000 | Dobrica |
| 6,295,289 B1 | * | 9/2001 | Ionescu et al. ............. 370/342 |

FOREIGN PATENT DOCUMENTS

| EP | 0969604 | 7/1999 |
| WO | 0070773 | 11/2000 |

* cited by examiner

Primary Examiner—Stephen Chin
Assistant Examiner—Erin M File
(74) Attorney, Agent, or Firm—Philip R. Wadsworth; Charles D. Brown; George C. Pappas (57) ABSTRACT

In one embodiment, the invention is directed toward methods for estimating the power of a received signal encoded with both pilot and non-pilot symbols. The method may include separately accumulating the pilot symbols and the non-pilot symbols and then estimating signal power by calculating a weighted sum of the accumulated pilot and non-pilot symbols. In this manner, a more accurate estimate of the power of the received signal can be obtained.

30 Claims, 7 Drawing Sheets

POWER ESTIMATION USING WEIGHTED SUM OF PILOT AND NON-PILOT SYMBOLS

FIELD

The invention relates generally to wireless communication, and more particularly to estimation of power of a received signal in a wireless communication system.

BACKGROUND

A number of different wireless communication techniques have been developed. One common technique used in wireless communication is code division multiple access (CDMA) signal modulation in which multiple communications are simultaneously transmitted over a spread spectrum radio-frequency (RF) signal. Some example wireless communication devices that have incorporated CDMA technology include cellular radiotelephones, PCMCIA cards incorporated within portable computers, personal digital assistants (PDAs) equipped with wireless communication capabilities, and the like.

In CDMA technology and other spread spectrum wireless communication technologies, maximizing system capacity, in terms of the number of simultaneous wireless transmissions that can be handled by the system, is of paramount concern. System capacity in a spread spectrum system, such as a CDMA system, can be maximized by carefully controlling the transmit power of each wireless communication device (WCD). In particular, the transmit power is controlled such that each transmitted signal arrives at a base station receiver at the same optimal power level. Similarly, the transmit power of the base station can be controlled so as to transmit the spread spectrum signal from the base station at an optimal power level.

For example, if a signal transmitted by a WCD arrives at the base station receiver at a power level that is too low, the bit-error-rate may be too high to permit high quality communication with that WCD. On the other hand, if the signal sent from the WCD is at a power level that is too high when received at the base station, the high power signal could interfere with communication between the base station and other WCDs in the system. This interference can adversely affect communications with the other WCDs in the system, thus reducing system capacity. For this reason, to maximize system capacity, it is highly advantageous to control signal power of transmitted signals from each WCD such that the signal can be received by the base station at or near a common optimal power level. Similarly, it is highly advantageous to control signal power of transmitted signals from the base station to one or more WCDs.

A forward link (sometimes referred to as a "downlink") refers to a signal sent from the base station to the WCD. A reverse link (sometimes referred to as an "uplink") refers to a signal sent from the WCD to the base station. The forward link from the base station to the WCD typically operates on a different frequency than the reverse link from the WCD to the base station. However, because the forward link and reverse link frequencies are typically within the same frequency band, a significant correlation between power loss in the forward and reverse links typically exists.

For this reason, power control in a WCD, for example, is sometimes implemented by estimating the received power in the forward link and then adjusting power transmission over the reverse link accordingly. For example, the WCD can estimate received power from the base station and compare the estimate to a target power level. If the estimate is less than the target power level, the WCD can increase its transmit power accordingly. If the estimate is greater than the target, the WCD can decrease its transmit power accordingly. In this manner, an estimate of received power in the WCD can be used to effectively control transmit power from the WCD. The base station may implement power control in a similar manner.

Another power control technique involves estimating received power and comparing the estimation to a target, before sending a command signal back to the device that sent the original signal. In other words, a base station can estimate received power from a WCD, compare the received power to a target, and transmit a command back to the WCD to control transmit power from the WCD. The command may take the form of one or more power control bits that direct the WCD to increment or decrement the level of transmit power. Similarly, the WCD can estimate received power from the base station, compare the received power to a target, and transmit a power control command back to the base station to control transmittal power from the base station. Thus, the base station and WCD can effectively communicate with one another to periodically adjust one another's transmission power so as to achieve more optimal power levels in the system.

Generating an optimal estimate of received power, however, can be very complex. For this reason, sub-optimal estimations are commonly used to provide adequate power estimations using less intensive computational techniques. Still, to the extent estimations of received power can be improved, system performance and capacity can likewise be improved.

SUMMARY

In general, the invention is directed to techniques for estimating the power of a received signal encoded with both pilot and non-pilot symbols. Pilot symbols generally refer to control symbols that are used to facilitate system synchronization, while non-pilot symbols refer to any of a number of other possible symbols such as transport format combination indicators (TFC symbols), transmit power control indicators (TPC symbols), feedback indicators (FBI symbols), and data symbols transmitted on the control channel. The techniques involve separately accumulating the pilot symbols and the non-pilot symbols and then estimating signal power by calculating a weighted sum of the accumulated pilot and non-pilot symbols. In this manner, a more accurate estimate of the power of the received signal can be obtained. The power estimation technique can be implemented at either a WCD or a base station.

In one example, the pilot symbols are coherently accumulated by summing the pilot symbols for a slot and then squaring the sum of the pilot symbols. A slot refers to a number of control symbols grouped together for power estimation purposes, or other purposes. The non-pilot symbols are non-coherently accumulated by squaring each non-pilot symbol and then summing the squares of the non-pilot symbols for the slot. A weighed sum of the accumulated pilot and non-pilot symbols can then be obtained using a weight factor. In particular, the accumulated non-pilot symbols can be multiplied by the weight factor before being summed with the accumulated pilot symbols. The weight factor may be a constant optimally determined by various simulations, or can be generated or selected as needed using an algorithm or a look up table.

In exemplary embodiments, the invention is directed toward one or more methods. For example, a method according to the invention may include accumulating pilot symbols of a first wireless signal and accumulating non-pilot symbols of the first wireless signal. For example the pilot symbols can be coherently accumulated and the non-pilot symbols can be non-coherently accumulated. A weighted sum of the accumulated pilot symbols and the accumulated non-pilot symbols can then be calculated to estimate power of the first wireless signal. Coherent accumulation generally refers to a process wherein the symbols are summed and then the summation is squared. Non-coherent accumulation generally refers to a process wherein each individual symbol is squared and then the squared symbols are summed.

After estimating the power of the first wireless signal, the estimate can be compared to a target value to determine whether the signal is too high, too low, or within an acceptable power range. For example, if the estimate is greater than the target value by more than a predetermined amount, the power of the first signal may need to be decreased. Similarly, if the estimate is less than the target value by more than a predetermined amount, the power of the first signal may need to be decreased. Accordingly, after comparing the estimate to the target value, the method may further include adjusting the power of the first wireless signal accordingly.

The method can be implemented, for example, in various devices within a wireless communication system to improve power control within the system. For example, in some embodiments, the invention is directed toward a base station that estimates the power of a signal sent from a wireless communication device by separately accumulating the pilot and non-pilot symbols of the signal and calculating a weighted sum of the accumulated pilot and non-pilot symbols. In other embodiments, the invention is directed toward a wireless communication device that estimates the power of a signal received from a base station.

The invention may be implemented in hardware, software, firmware, or any combination thereof. If implemented in software, the invention may be directed toward a computer readable medium carrying program code, that when executed, performs one or more of the methods mentioned above.

The invention can provide a number of advantages. In particular, the invention can facilitate improved estimation of the power of received signals in a wireless communication system. This, in turn, can increase system capacity, in terms of the number of simultaneous wireless transmissions that can be handled by the system. If power levels of received signals are too low, wireless communication may be ineffective. However, if power levels are too high, the unnecessary power causes interference to other signals in the system, thereby reducing system capacity. For this reason, system capacity can be maximized by ensuring that every signal in the wireless communication system is received at or near an optimal power level. By improving estimation of the receive power, the invention can more readily enable the proper power adjustments to be made.

Improved estimations of received power can also improve power management within the wireless communication system. In some cases, battery life of the wireless communication devices in the system may be prolonged when the invention is implemented. For example, by decreasing transmit power when the power is received above the target value, battery life can be prolonged. The invention improves the estimation of received power, and therefore may prolong battery life of wireless devices by facilitating more accurate power adjustments.

Additional advantages in terms of simplicity and adjustability can also be achieved by implementing the invention. In particular, the invention provides a relatively simple way to estimate power of a signal that has both pilot and non-pilot symbols. Moreover, the power estimation techniques may be adjusted and optimized for various scenarios. In some embodiments, for example, the weight factor used in the estimation can be dynamically generated or selected based on input criteria to more effectively weigh the contributions of the pilot and non-pilot symbols in the power estimation.

Additional details of these and other embodiments are set forth in the accompanying drawings and the description below. Other features, objects and advantages will become apparent from the description and drawings, and from the claims.

DETAILED DESCRIPTION

In the description below, various aspects of the invention are described in terms of a wireless signal transmitted over a reverse link, such as from a wireless communication device (WCD) to a base station. In that case, the invention may involve estimating the power level of the signal received at the base station and sending a control signal from the base station back to the WCD to control transmission power of subsequent signals transmitted from the WCD. The invention, however, can be implemented in the opposite manner. For example, the invention can be implemented to estimate the power level of a signal received at the WCD. In that case, the WCD would generate the control signal and send it to the base station to control signal strength of subsequent transmission from the base station. In still other cases, the estimation techniques can be used by a WCD to immediately adjust signal power of transmissions to the base station, or used by the base station to immediately adjust signal power of transmissions to the WCD. For example, the device implementing the power estimation technique may take advantage of the correlation between power loss in the forward and reverse links to immediately adjust its power according to the estimation of received power. Accordingly, the description below is meant to be exemplary of power estimation techniques that can be used to improve power control within a wireless communication system. Base stations are also commonly referred to as base transceiver systems (BTS).

Figure 1:
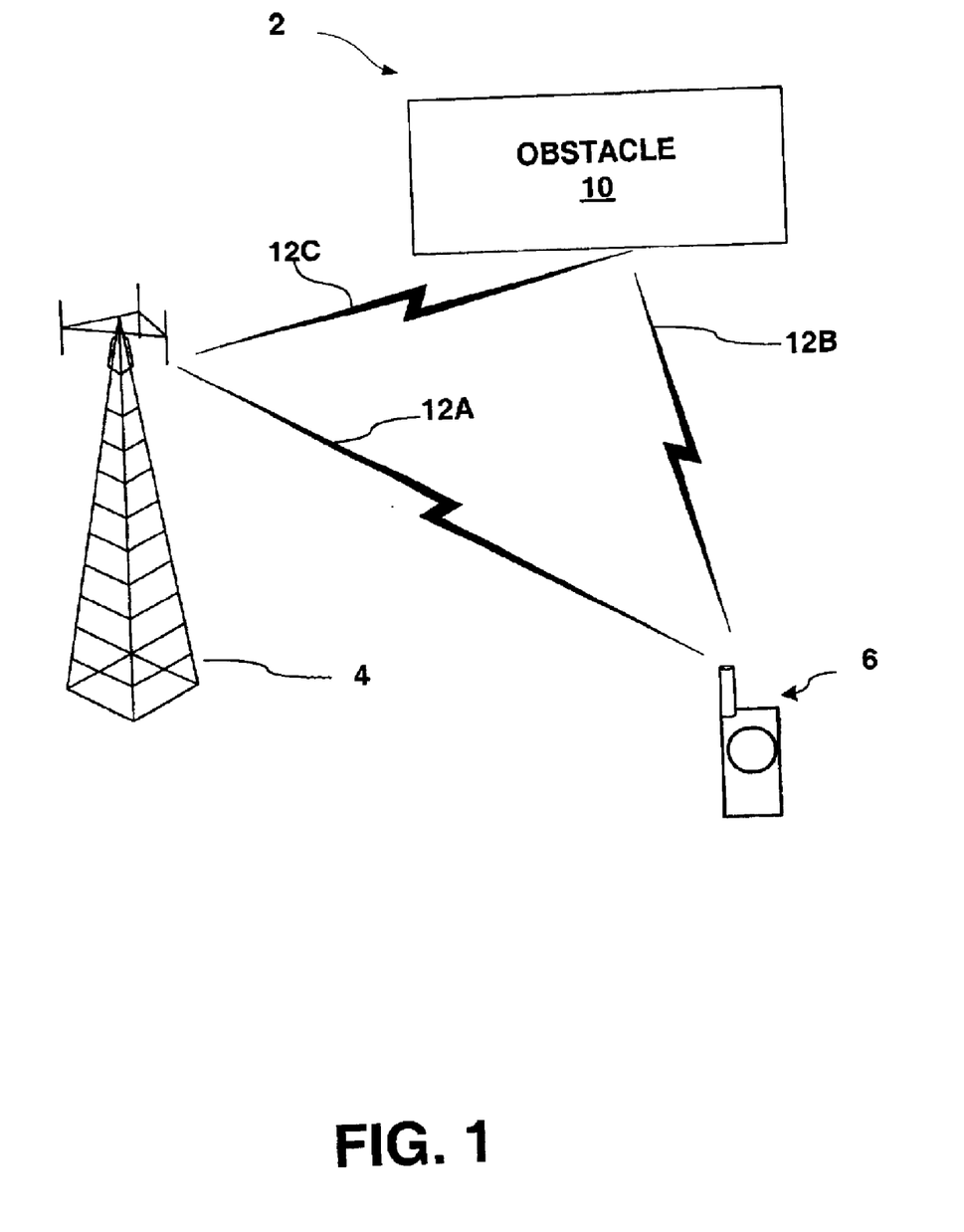
FIG. 1 is a block diagram illustrating a wireless communication system according to the invention.

FIG. 1 is a block diagram illustrating a spread spectrum wireless communication system 2, in which base station 4 receives signals 12 via one or more paths. In particular, base station 4 receives signal 12A from WCD 6 via a first path, as well as signal 12C, via a second path caused by reflection of signal 12B from obstacle 10. Obstacle 10 may be any structure proximate to WCD 6 such as a building, bridge, car, or even a person. Examples of WCD 6 include a cellular radiotelephone, a satellite radiotelephone, a PCMCIA card incorporated within a portable computer, a personal digital assistant (PDA) equipped with wireless communication capabilities, and the like. Base station 4 may include a base station controller (not shown) to provide an interface between base station 4 and a public switched telephone network (not shown).

Regardless of the number of paths, base station 4 receives signal 12 and estimates the power of that signal. Base station 4 then compares the estimated signal power of signal 12 to a target value to determine whether signal 12 was received at or near an optimal power level. For example, if the power level of signal 12 is below the target value, base station 4 may send a command signal to WCD 6 to instruct WCD 6 to increase its transmit power. Similarly, if the power level of signal 12 is greater than the target value, base station 4 may send a command signal to WCD 6 to instruct WCD 6 to decrease its transmit power. Base station 4 utilizes one or more of the estimation techniques described in greater detail below, to improve estimation of the power of signal 12. In this manner, improved power control can be achieved within system 2.

System 2 may be designed to support one or more CDMA standards including, for example, (1) the "TIA/EIA-95-B Mobile Station-Base Station Compatibility Standard for Dual-Mode Wideband Spread Spectrum Cellular System" (the IS-95 standard), (2) the "TIA/EIA-98-C Recommended Minimum Standard for Dual-Mode Wideband Spread Spectrum Cellular Mobile Station" (the IS-98 standard), (3) the standard offered by a consortium named "3rd Generation Partnership Project" (3GPP) and embodied in a set of documents including Document Nos. 3G TS 25.211, 3G TS 25.212, 3G TS 25.213, and 3G TS 25.214 (the WCDMA standard), (4) the standard offered by a consortium named "3rd Generation Partnership Project 2" (3GPP2) and embodied in a set of documents including "TR-45.5 Physical Layer Standard for cdma2000 Spread Spectrum Systems," the "C.S0005-A Upper Layer (Layer 3) Signaling Standard for cdma2000 Spread Spectrum Systems," and the "C.S0024 CDMA2000 High Rate Packet Data Air Interface Specification" (the CDMA2000 standard), (5) the HDR system documented in TIA/EIA-IS-856, "CDMA2000 High Rate Packet Data Air Interface Specification, and (6) some other standards.

Figure 2:
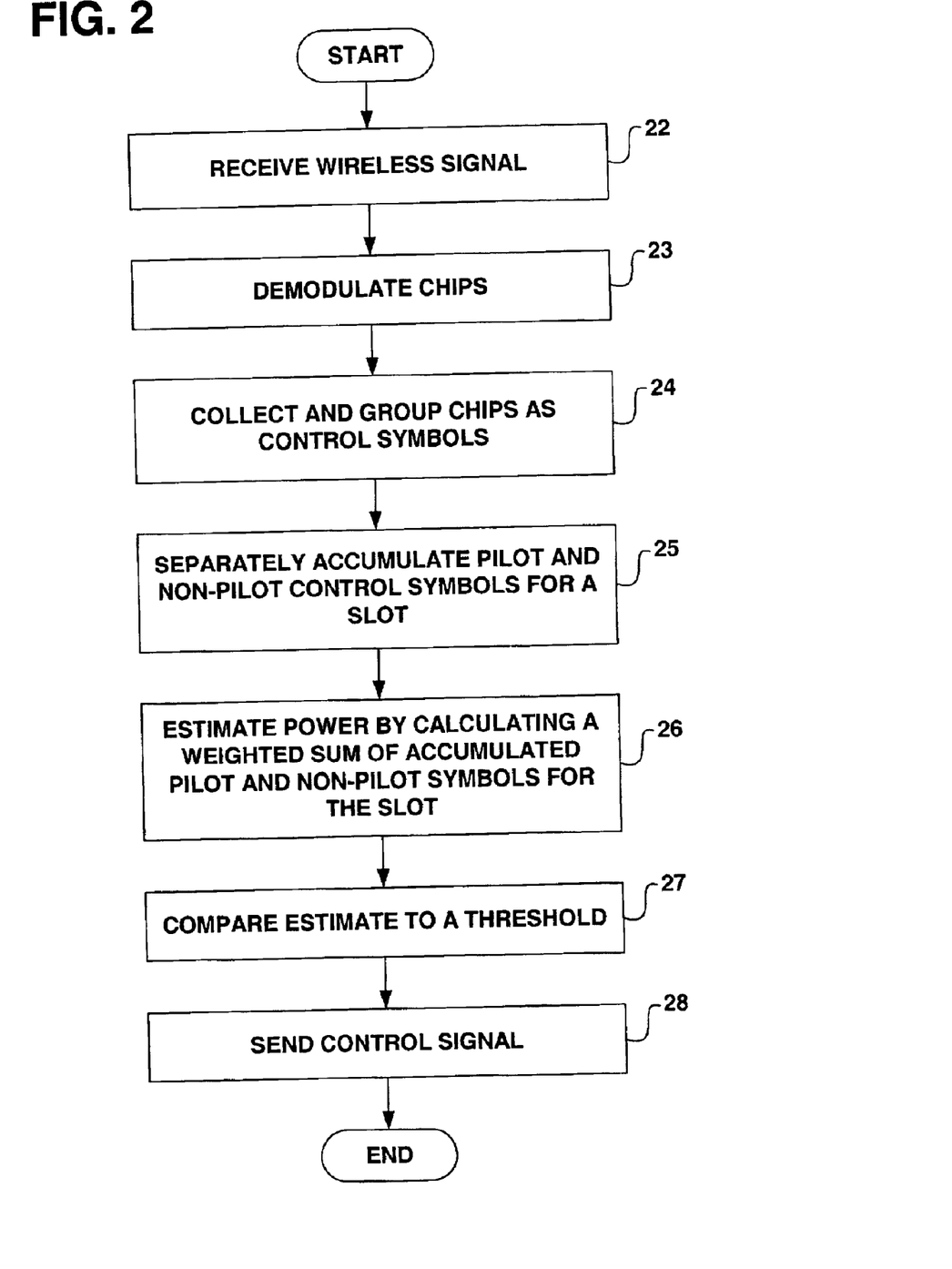
FIG. 2 is a flow diagram illustrating a method that uses a power estimation technique to improve the accuracy of power estimation of received signals in base station.

FIG. 2 is a flow diagram illustrating a method that uses a power estimation technique to improve the accuracy of power estimation of received signals in base station 4. Again, although the method is described as being implemented in base station 4 to control the power of signals transmitted from WCD 6, the invention could be implemented the other way around.

As shown, base station 4 receives a wireless signal 12 (22). In particular, signal 12 may comprise the control channel signal of a CDMA communication system, and typically includes a train of pulses, which are referred to as "chips." As signal 12 is received, each chip is demodulated by base station 4 (23). For example, if signal 12 is a spread spectrum CDMA signal, demodulation may involve despreading of pseudo-noise (PN) codes and decovering of orthogonal codes for each chip (sometimes referred to as "Walsh decovering"). The results of demodulation are then colleted and grouped into control symbols (24). For example, each control symbol may be generated from a stream of 256 demodulated chips.

Control symbols can be categorized as either pilot symbols or non-pilot symbols. A "slot" refers to a group of control symbols, and typically includes ten control symbols, although the invention is not limited in that respect. For example, the pilot symbols typically make up the first few control symbols of a slot, and the remaining control symbols comprise various non-pilot symbols. As described in greater detail below, a power estimation of the incoming signal can be made for each slot using both the pilot and non-pilot symbols of the slot. In particular, the invention makes use of a weighted sum of accumulated pilot symbols and accumulated non-pilot symbols as detailed below.

Pilot symbols refer to control symbols that are used to facilitate system synchronization and provide robust time, frequency and/or phase tracking of transmitted signals. The base station can be programmed or designed to know which symbols of a slot are the pilot symbols. Non-pilot symbols, on the other hand, refer to any other control symbols, i.e., control symbols that are not pilot symbols. For example, non-pilot symbols may include transport format combination indicators (TFC symbols) that convey information about how data is organized on the data channel, transmit power control indicators (TPC symbols) that convey power control commands, feedback indicators (FBI symbols) that convey various feedback information, data symbols transmitted on the control channel, or any other symbols. The base station may be programmed or designed to know which symbols of a slot correspond to which non-pilot symbols.

In accordance with the invention, pilot symbols and non-pilot symbols are separately accumulated (25). In one particular embodiment, pilot symbols are coherently accumulated for a slot while non-pilot symbols are non-coherently accumulated for the slot as described in greater detail below. Then, once the pilot symbols and non-pilot symbols for a given slot have been separately accumulated, a weighted sum of the accumulated pilot symbols and the accumulated non-pilot symbols can be calculated to estimate power of the first wireless signal 12 (26). Conventional techniques have either ignored the non-pilot symbols for power estimation or simply summed the accumulated pilot and non-pilot symbols without applying a weight factor to the non-pilot symbols. The invention, however, applies a weight factor to the non-coherently accumulated non-pilot symbols, which can improve the accuracy of power estimation.

Once an estimate of the power level of first wireless signal has been calculated, the estimate can be compared to a target value to determine whether the received power is too high or too low (27). A power control signal can then be sent from base station 4 back to WCD 6 in order to command WCD 6 to adjust its power accordingly (28). For example, if the estimate is greater than the target value by more than a predetermined amount, the power control signal may command WCD 6 to decrease its transmit power. If the estimate is less than the target value by more than a predetermined amount, the control signal may command WCD 6 to increase its transmit power. Typically, the commands cause an incremental power adjustment either up or down, such as a 0.5 decibel increase or decrease in transmit power. The specific sensitivity of up or down power adjustment commands, however, can be varied or defined as desired.

Figure 3:
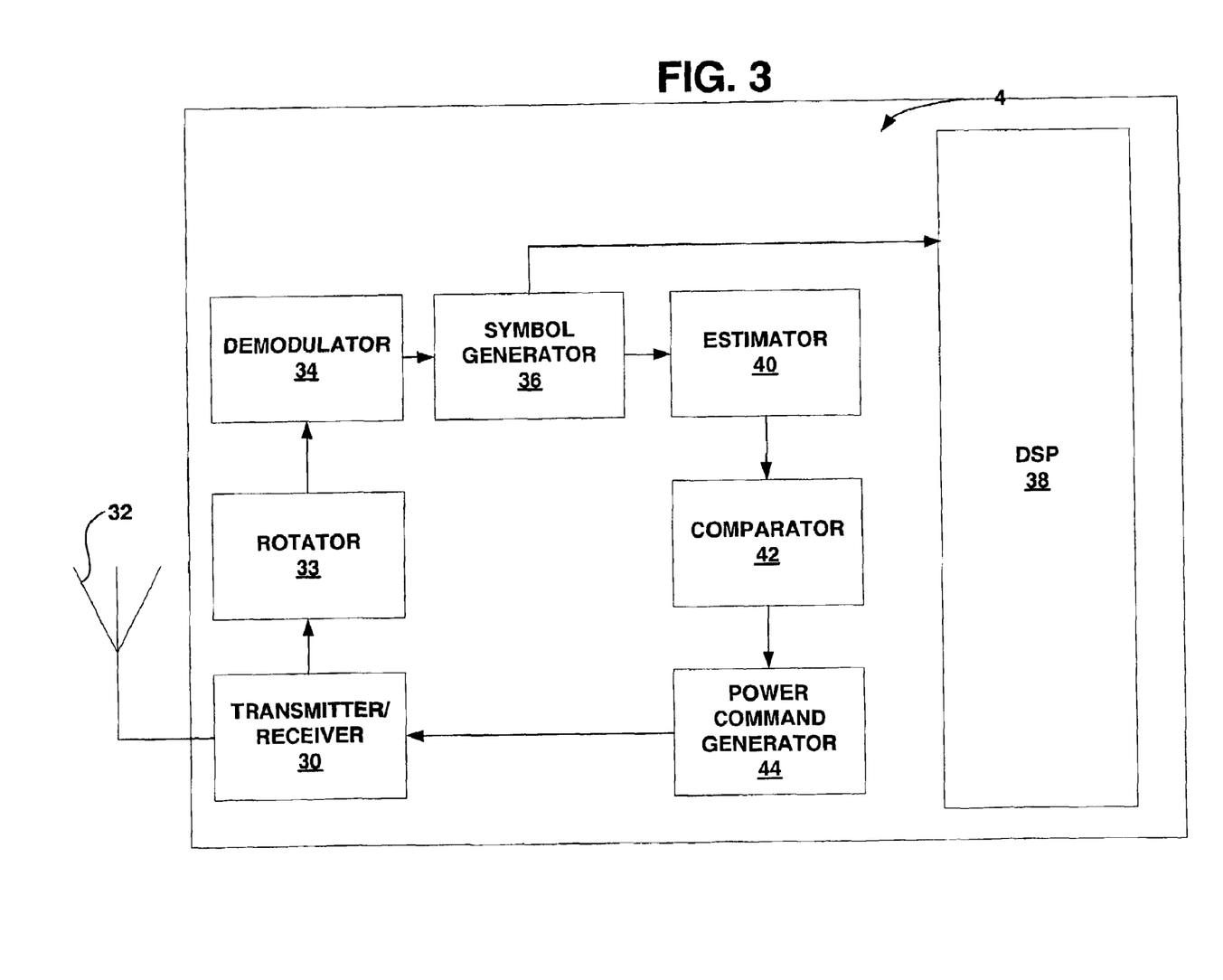
FIG. 3 is a block diagram illustrating exemplary hardware that can be used to implement various aspects of the invention.

FIG. 3 is a block diagram illustrating exemplary hardware that can be used to implement various aspects of the invention. Again, the hardware of FIG. 3 is described as forming part of base station 4, but similar hardware could form part of WCD 6 to estimate received power and control the power of subsequent transmissions from base station 4. Base station 4 may be designed to support one or more CDMA standards or designs, such as IS-95, IS-98, W-CDMA, CDMA2000, or the like.

As shown in FIG. 3, hardware of base station 4 includes a transmitter/receiver 30 (transceiver) coupled to antenna 32. When an incoming RF signal is received, such as a control channel signal of the CDMA communication system, transmitter/receiver 30 conditions the received signal, e.g., filters, amplifies and digitizes the signal, and then passes the digitized signal to rotator 33. Rotator 33 typically implements a frequency tracking loop (not shown) and adjusts the frequency of the received signal to account for such things as Doppler shift or frequency variations caused by variation in local clocks of the devices in system 2.

After adjusting the frequency of the received signal, the signal is sent to demodulator 34. Demodulator 34 demodulates individual chips of the signal, such as by despreading PN codes and decovering orthogonal codes for each chip. The results of demodulation are then grouped into control symbols by symbol generator 36. Symbol generator 36 can then pass the control symbols to digital signal processor (DSP) 38, which performs symbol demodulation.

In addition, symbol generator 36 passes the control symbols to estimator 40. Estimator 40 estimates the power of the received signal using the control symbols. In particular, estimator 40 separately accumulates pilot symbols and non-pilot symbols, and then estimates the power of the received signal by calculating a weighted sum of the accumulated pilot symbols and non-pilot symbols. For example, the pilot symbols can be coherently accumulated by summing the pilot symbols for a given slot and then squaring the sum of the pilot symbols. The non-pilot symbols can be non-coherently accumulated by squaring each non-pilot symbol for a given slot and then summing the squares of the non-pilot symbols.

Estimator 40 calculates the weighed sum using a weight factor=alpha ($\alpha$). In particular, estimator 40 multiplies the non-coherently accumulated non-pilot symbols by alpha and then sums that result with the coherently accumulated pilot symbols.

In other words, estimator 40 generates an estimate of power according to the following equation:

Estimate=(Coherently Accumulated Pilot Symbols)+($\alpha$)(Non-Coherently Accumulated Non-Pilot Symbols)

Additional details of the weight factor ($\alpha$), and coherent and non-coherent accumulation are described below.

After estimating the power level of the received signal, estimator 40 passes the estimate to comparator 42, which compares the estimate to a target value. The target value corresponds to the current desired power level and can be chosen as desired, or even varied for different devices or scenarios. After making the comparison, comparator 42 sends a signal to power command generator 44 indicating whether the power level of the received signal was too high, too low, or within an acceptable range. Power command generator 46 then generates the appropriate power command and forwards the command to transmitter/receiver 30 to be sent from base station 4 to WCD 6 (not shown in FIG. 3). For example, if comparator 42 detects that the estimate is less than the target value by some amount, power command generator 44 generates a power command that will direct WCD 6 to increase its transmit power. Similarly, if comparator 42 detects that the estimate is greater than the target value by some amount, power command generator 44 generates a power command that will direct WCD 6 to decrease its transmit power.

In some embodiments, the power commands direct incremental up or down adjustments in transmit power according to defined increments. Such incremental power adjustment can simplify the implementation of power commands. In other words, only a single up power command and a single down power command would need to be supported. However, in other embodiments, a number of up and down power commands may be supported to facilitate more exacting power adjustment in response to a single command. For example, a number of different power up or power down commands could be supported, with each different power command, directing a different incremental adjustment. In that case, although more commands would need to be supported, the system may be able to more adequately maintain substantially optimal power levels within the system.

Figure 4:
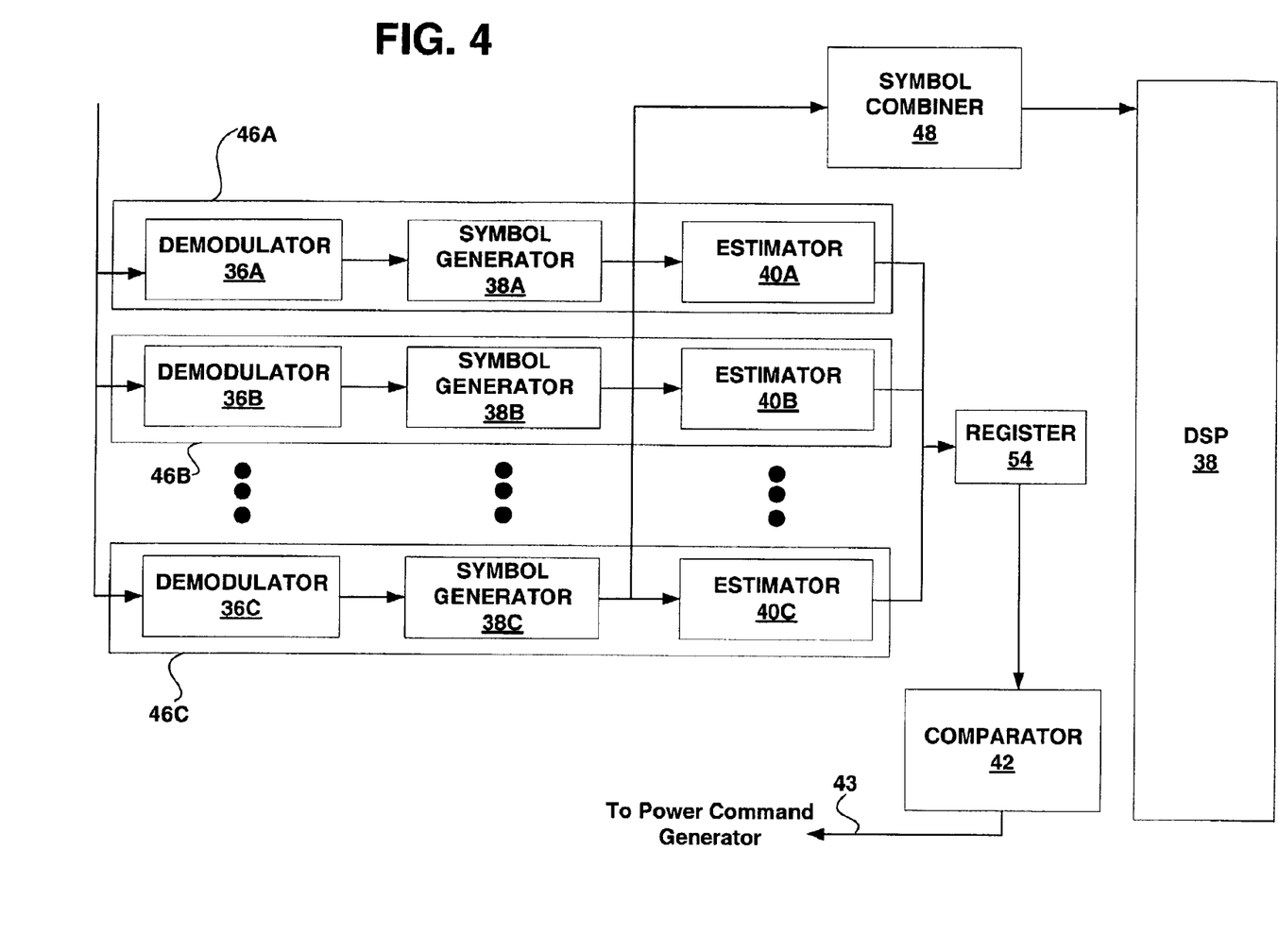
FIG. 4 is another block diagram of a portion of the hardware of a base station according to one embodiment of the invention.

FIG. 4 is a more detailed block diagram of a portion of the hardware of base station 4, according to one embodiment of the invention. In particular, FIG. 4 illustrates hardware that forms part of a "RAKE receiver" that includes a number of "fingers" 46A–46C (hereafter fingers 46) to track different paths. The different paths tracked by the fingers of the RAKE receiver may correspond to the signals sent from different sources, or a signal sent from the same source but having been reflected off one or more objects, i.e., a multi-path signal. Each finger 46 may include its own demodulator 34A–34C that performs despreading and decovering of chips in signals corresponding to a given path. Each finger 46 may also include separate symbol generators 36A–36C for grouping chips into control symbols. The signals sent from symbol generators 36A–36C are often referred to as soft decisions that are combined in symbol combiner 48 to generate a hard decision that is sent to DSP 38. In other words, each finger 46 may generate the same or similar control symbols, which can be sent to symbol combiner 48 to rectify any discrepancies between control symbols generated by the various fingers 46.

In addition to sending the control symbols to symbol combiner 48, symbol generators 38A–38C also send the control symbols to estimators 40A–40C to facilitate estimation of the power of the received signals that correspond to the various fingers 46. Each estimator coherently accumulates the pilot symbols and non-coherently accumulates the non-pilot symbols, before calculating a weighted sum. Each weighted sum generated by estimators 40A–40C represents an estimate of the power level of the signal received in a given finger 46. These weighted sums for different fingers 46 can be combined in register 54, and the combination of the weighted sums can be sent to comparator 42 to be compared to a target value. The comparator can then send a signal to power command generator (as indicated at 43) to facilitate the generation of the appropriate control signal that can be sent back to WCD 6.

Figure 5:
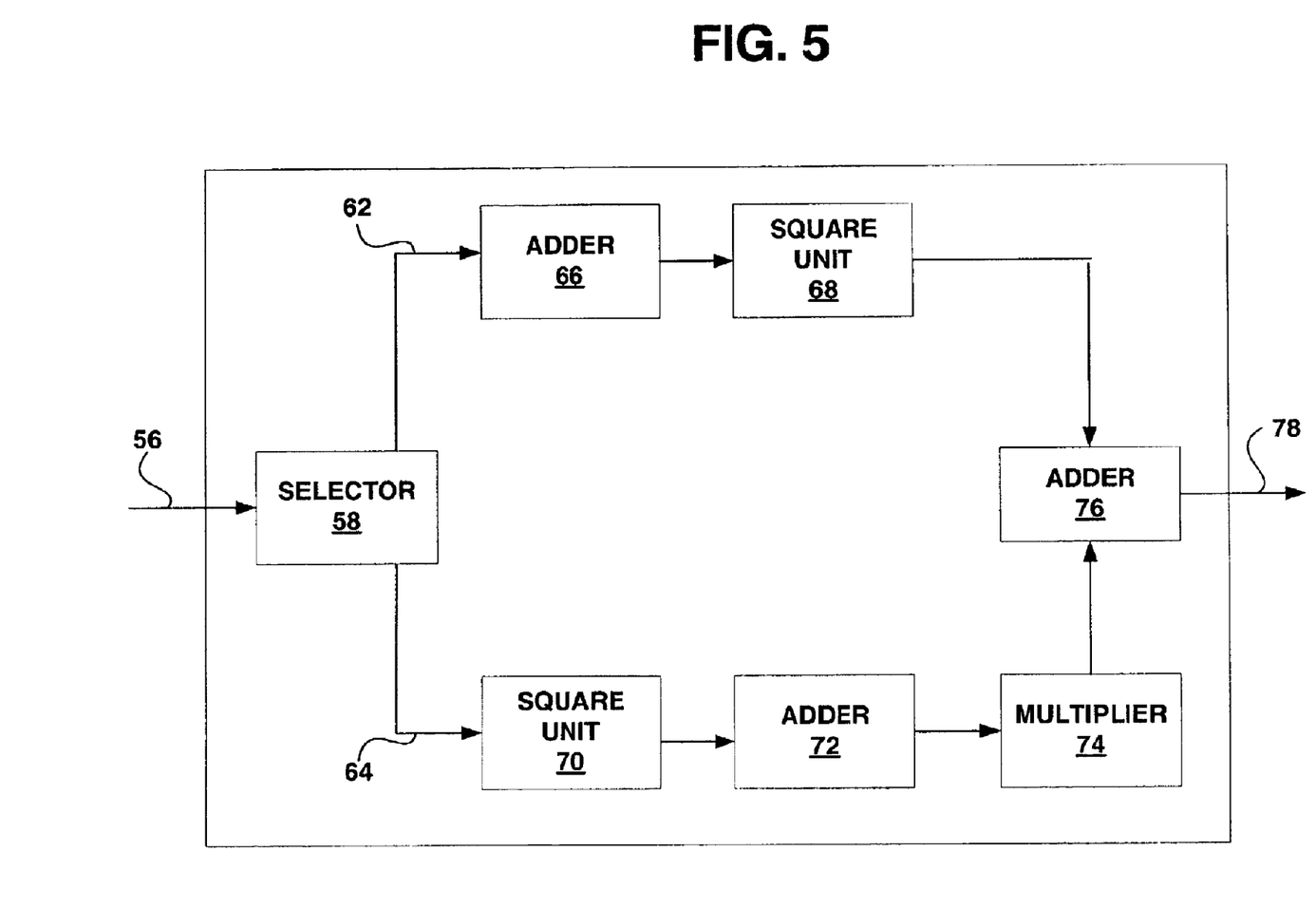
FIG. 5 is a more detailed block diagram illustrating one embodiment of an estimator according to the invention.

FIG. 5 is a more detailed block diagram illustrating one embodiment of estimator 40. If used in a RAKE receiver as illustrated in FIG. 4, estimator 40 may correspond to any of estimators 40A–40C. As shown in FIG. 5, estimator 40 receives incoming control symbols (as indicated at 56). Selector 58 separates control symbols into pilot symbols (as indicated at 62) and non-pilot symbols (as indicated at 64). For example, selector 58 may be programmed to know which incoming symbols of a slot correspond to the pilot symbols.

All of the pilot symbols for a given slot are added together by adder 66 before being squared by square unit 68. The process of summing the pilot symbols and then squaring the result is referred to as coherent accumulation of the pilot symbols. The non-pilot symbols are first squared by square unit 70 and the squares of the non-pilot symbols are added together by adder 72. The process of squaring the non-pilot symbols and then adding the squared results together is referred to as non-coherent accumulation of the non-pilot symbols.

After the non-pilot symbols have been non-coherently accumulated, the result of the non-coherent accumulation is multiplied by a weight factor α using multiplier 74. The result of this multiplication is then summed with the result of the coherent accumulation of pilot symbols using adder 76. The final result (as indicated at 78) provides an improved estimate of the power of the signal received by base station 4. In particular, the use of the weight factor α in conjunction with non-coherent accumulation of the non-pilot symbols can improve power estimation.

The final result (as indicated at 78) can be compared to a target value to determine whether the received power is too high, too low, or within an acceptable range. If estimator 40 of FIG. 5 corresponds to one estimators 40A–40C of a RAKE receiver, the final result (as indicated at 78) may be combined with similar final results that represent estimates for signal strength of the various fingers of the RAKE receiver. In that case, the combination of the final results would represent the combined signal strength of all the fingers, and could be compared to the target value.

Figure 6:
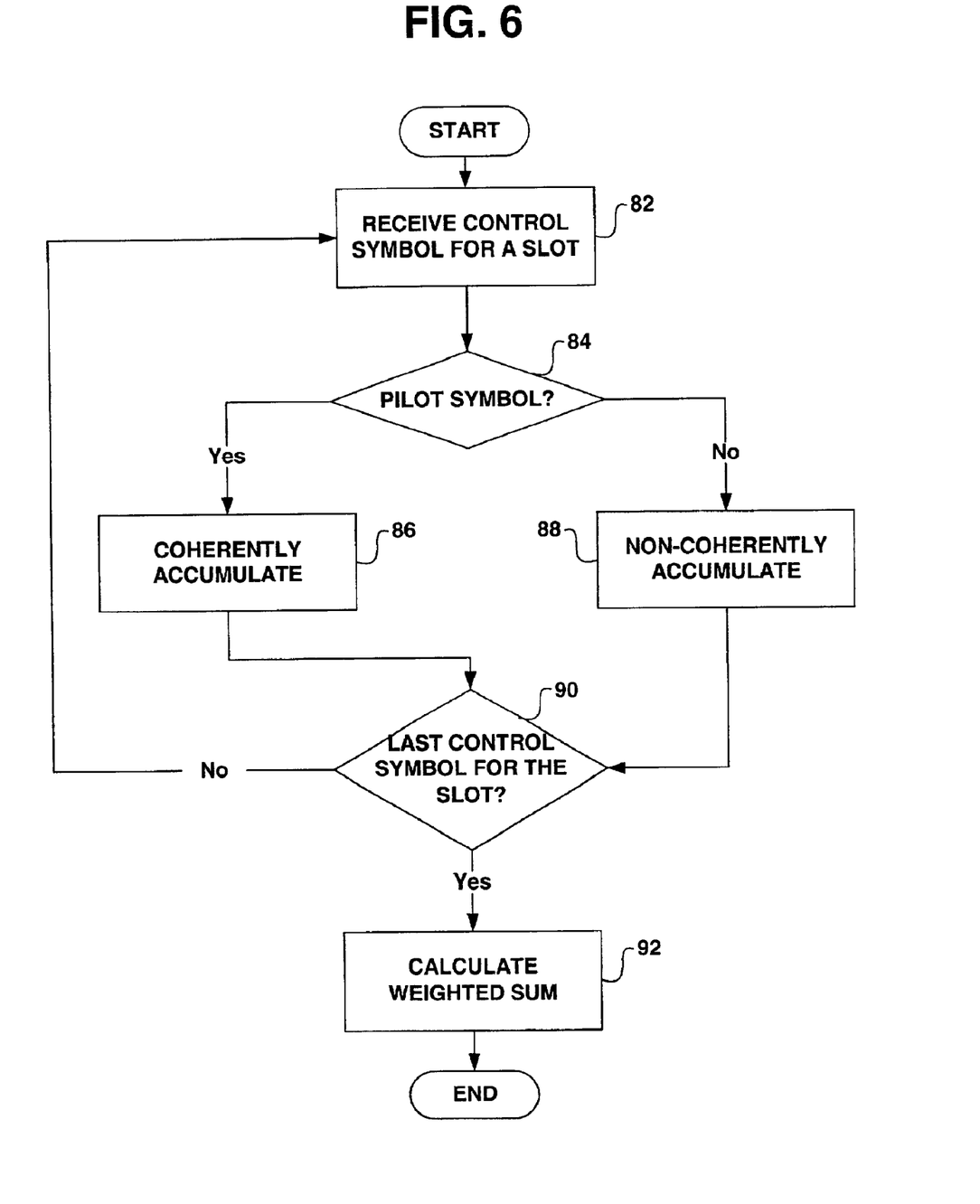
FIG. 6 is a flow diagram illustrating functionality that can be included within estimator according to the invention.

FIG. 6 is a flow diagram illustrating functionality that can be included within estimator 40 such as one of the estimators of a RAKE receiver according to the invention. As shown, when the estimator 40 receives a control symbol for a slot (82), it determines whether the control symbol is a pilot symbol (84). If the control symbol is a pilot symbol then it is coherently accumulated (86), and if it is a non-pilot symbol it is non-coherently accumulated (88). The process repeats itself for all the control symbols in a given slot until the last control symbol for the slot has been accumulated (90). Estimator 40 then calculates a weighted sum using the coherently accumulated pilot symbols and non-coherently accumulated non-pilot symbols (92), such as by multiplying the non-coherent accumulation of non-pilot symbols by a weight factor and combining that result with the coherently accumulated pilot symbols.

Figure 7:
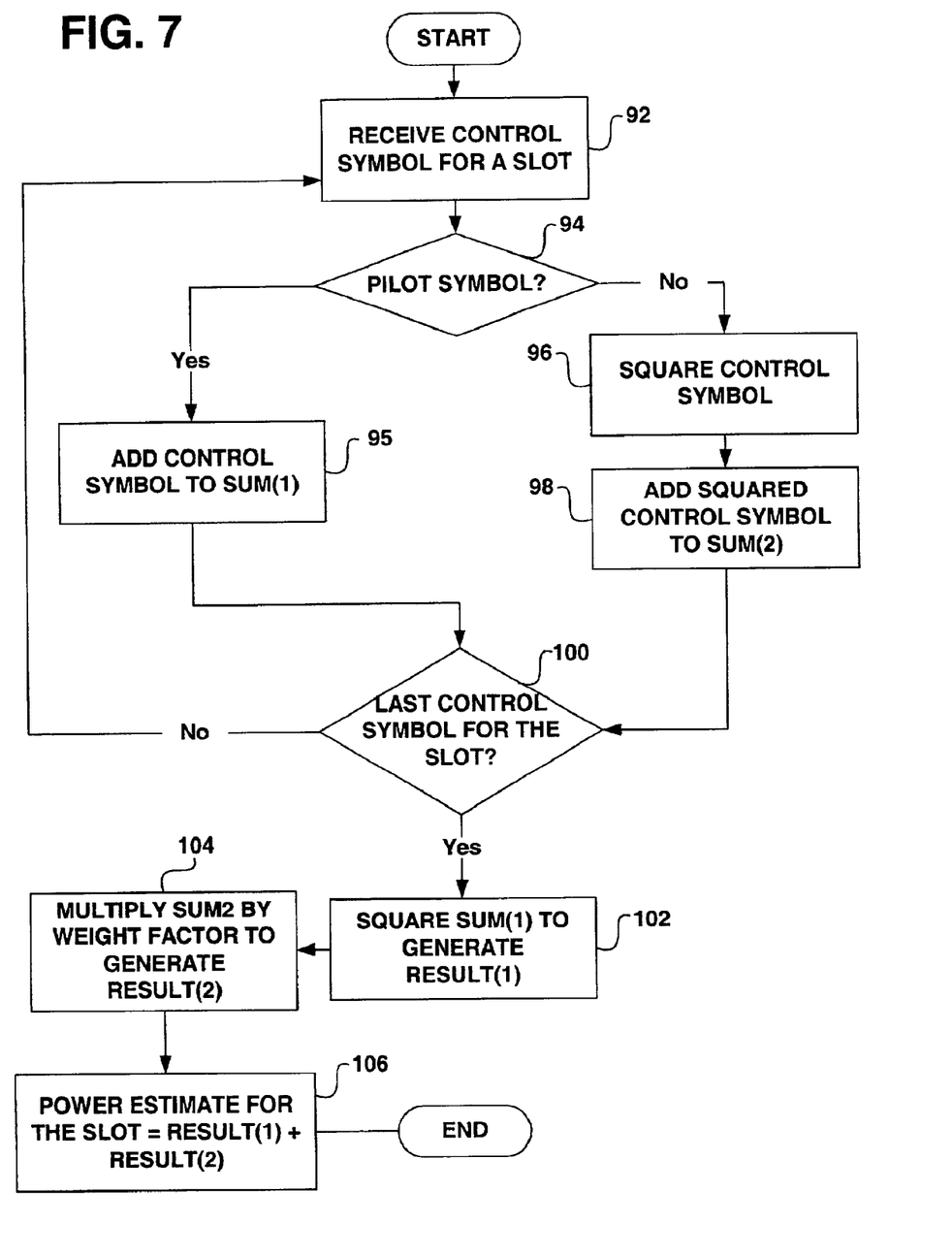
FIG. 7 is another flow diagram illustrating in greater detail the functionality that can be included within an estimator according to the invention.

FIG. 7 is another flow diagram illustrating in greater detail the functionality that can be included within an estimator according to the invention. As shown, a control symbol for a slot is received by estimator 40 (92). Estimator 40 determines whether the control symbol is a pilot symbol (94). If so, estimator 40 adds the control symbol to SUM(1) (95). If not, estimator squares the control symbol (96) and adds the squared control symbol to SUM(2) (98). This process repeats itself for a number of symbols that define a given slot (100). For example, a slot may be defined to include any number of symbols, but typically includes 10 symbols. Once the last control symbol for the slot has been accumulated (100), SUM(1) is squared to generate RESULT(1) (102). Next, SUM(2) is multiplied by a weight factor to generate RESULT(2) (104). Estimator 40 can then estimate the power of the received signal corresponding to the slot as the sum of RESULT(1) and RESULT(2) (106). In this manner, estimator 40 can easily and effectively generate an accurate estimate of the power of the received signal. This estimate can then be used to provide power control within system 2 in a manner that promotes increased system capacity.

The weight factor (α) can be established in any of a variety of different ways. For example, in some embodiments, α is predetermined, and in other embodiments α is generated using an algorithm, a mathematical function or the like. In still other embodiments, α is generated using a look-up table. Some specific examples of methods and techniques of determining or generating α are discussed below.

In one embodiment, α is simply defined as the number of pilot symbols in a slot multiplied or divided by a constant. For example, the very simple estimate where α equals the number of pilot symbols divided by 2 (i.e., multiplied by 0.5) has been shown to generate very accurate estimates of the power of a received uplink signal of W-CDMA. In that case, between 0.2 and 1.0 decibel output signal-to-noise (SNR) gains were achieved, in comparison to estimation techniques that did not incorporate a weight factor. Simulations can be run to determine the best constant for α calculation purposes.

It is often advantageous to choose α so as to maximize the SNR of the estimate. The SNR of the estimate can be defined as:

$$10 \text{ Log } 10((\text{Mean}(\text{estimate})/\text{std}(\text{estimate}))^2$$

In general, the α that maximizes the SNR of the estimate varies with the SNR of the received signal and the number of pilot vs. non-pilot symbols. However, because the SNR of the received signal is unknown, it may be chosen (for α calculation purposes) as being the same as the previous estimate, e.g., the estimate corresponding to the previous slot. An input variable representing the number of pilot vs. non-pilot symbols could then be used to determine α. Calculating α in this manner can result in very accurate signal strength estimates for many scenarios.

In still other embodiments, α can be calculated using a lookup table (LUT). For example, the entries of the LUT may be determined using simulations such that α is an effective weight factor, even as variables change. For example, a LUT could be used to vary α as a function of the previous slot SNR and the current slot format, i.e., the number of pilot vs. non-pilot symbols. These and other techniques may be used to generate α so as to achieve the accurate power estimates of the received signals.

In other embodiments, the estimation can be improved even further by separately accumulating the different non-pilot symbols and assigning different weights to the various accumulations. In one example, the non-pilot symbols include transport format combination indicators (TFC symbols) that convey information about how data is organized on the data channel, transmit power control indicators (TPC symbols) that convey power control commands and feedback indicators (FBI symbols) that convey various feedback information. Each of these symbols, for example, could be separately accumulated, either coherently or non-coherently, and then a different weight factor could be assigned to each type of symbol accordingly. Simulations can be run to determine the optimal weight factors that should be assigned to the different symbols in various scenarios. Generally, the symbols can be coherently accumulated if the sign of the underlying bits in a given set of symbols is known to be the same for all symbols in that set. For example, in the uplink of the WCDMA standard, even though the sign of the TPC bits is unknown, it is known that all TPC bits in a slot have the same sign. Therefore, in the uplink of WCDMA, the TPC symbols can be coherently accumulated. In that case, coherent accumulation would not result in one symbol of the set canceling out another symbol in the set during the coherent accumulation.

In one specific example, the pilot symbols are coherently accumulated, the TPC symbols are separately coherently accumulated, and the TFC symbols and FBI symbols are collectively non-coherently accumulated. In that case, a weight factor α could be assigned to the coherently accumulated TPC symbols and a weight factor β could be assigned to the non-coherently accumulated TFC and FBI symbols. The power estimate of the received signal, then, could be calculated as:

Estimate=(Coherently Accumulated Pilot Symbols)+(α)(Coherently Accumulated *TPC* Symbols)+(β)(Non-coherently Accumulated *TFC* and *FBI* Symbols)

The various estimation techniques have been described as being implemented in hardware. The techniques, however, could alternatively be implemented in software, firmware or any combination of hardware and software. If implemented in software, the techniques may be embodied in program code initially stored on a computer readable medium such as a hard drive or magnetic, optical, magneto-optic, phase-change, or other disk or tape media. For example, the program code can be loaded into memory and then executed in a processor. Alternatively, the program code may be loaded into memory from electronic computer-readable media such as EEPROM, or downloaded over a network connection. If downloaded, the program code may be initially embedded in a carrier wave or otherwise transmitted on an electromagnetic signal. The program code may be embodied as a feature in an application program providing a wide range of functionality.

If the invention is implemented in program code, the processor that executes the program code may take the form of a microprocessor and can be integrated with or form part of a wireless computer, a WCD, a base station, a wireless network router, or the like. The memory may include random access memory (RAM) storing program code that is accessed and executed by processor to carry out the various techniques described above.

Exemplary hardware implementations may include implementations within a DSP, and application specific integrated circuit (ASIC), a field programmable gate array (FPGA), a programmable logic device, specifically designed hardware components, or any combination thereof.

Various embodiments of the invention have been described. For example, power estimation techniques have been described for use in a wireless communication system. Many aspects of the invention have been described as being carried out in a base station to estimate received power from a WCD and accordingly control subsequent transmit power from that WCD. However, as mentioned above, the invention could be implemented the other way around. In W-CDMA, the control channel signal in the forward link from the base station to the WCD typically includes only pilot symbols, and thus, the separate accumulation of pilot and non-pilot symbols would not be necessary in the forward link of W-CDMA. Other standards, such as standards yet to be developed, however, may include non-pilot symbols within the control channel signal in the forward link. In that case, the invention could improve power estimation of signals received from the base station by the WCD.

In still other cases, the estimation techniques could be used to automatically adjust the transmit power of a WCD after estimating received power from the base station, and vice versa. In other words, a correlation between power loss in the forward and reverse links can be exploited. In that case, upon generating the estimate and comparing the estimate to a target value, the power control signal could be issued to the device that estimated the power of the incoming signal to control the power of subsequent signals sent from that device.

In addition, various other modifications may be made without departing from the spirit and scope of the invention. For example, accumulation techniques other than the coherent and non-coherent accumulations described above could be used. In addition, other techniques for calculating the weight factor or weight factors could also be used. Moreover, the non-pilot symbols may include any symbols, including for example, data symbols transferred over the control channel. Other wireless communication systems, including systems that do not use spread spectrum signals may also utilize the power estimation techniques described herein. Accordingly, these and other embodiments are within the scope of the following claims.

What is claimed is:

1. A method comprising:
accumulating pilot symbols of a first wireless signal;
accumulating non-pilot symbols of the first wireless signal;
selecting a weight factor from a lookup table, the weight factor comprising a number of pilot symbols in the accumulated pilot symbols multiplied by a constant; and
calculating a weighted sum of the accumulated pilot symbols and the accumulated non-pilot symbols using the selected weight factor to estimate power of the first wireless signal.

2. The method of claim 1, wherein accumulating pilot symbols comprises coherently accumulating a number of pilot symbols corresponding to a slot by summing each of the number of pilot symbols and squaring the sum of the number of pilot symbols.

3. The method of claim 2, wherein accumulating the non-pilot symbols comprises non-coherently accumulating a number of non-pilot symbols corresponding to a slot by squaring each of the number of non-pilot symbols and summing the squares of the number of non-pilot symbols.

4. The method of claim 1, wherein accumulating the non-pilot symbols comprises non-coherently accumulating a number of non-pilot symbols corresponding to a slot by squaring each of the number of non-pilot symbols and summing the squares of the number of non-pilot symbols.

5. The method of claim 1, further comprising comparing the weighted sum to a target value and generating a power control signal based on the comparison.

6. The method of claim 5, further comprising controlling transmission power of a wireless communication device based on the power control signal.

7. The method of claim 5, further comprising controlling transmission power of a base station based on the power control signal.

8. The method of claim 5, further comprising wirelessly communicating a second wireless signal to control transmission power of a wireless communication device, wherein the second wireless signal includes the power control signal.

9. The method of claim 5, further comprising wirelessly communicating a second wireless signal to control transmission power of a base station, wherein the second wireless signal includes the power control signal.

10. The method of claim 1, further comprising calculating the weighted sum by summing the accumulated pilot symbols with a result of the weight factor multiplied by the accumulated non-pilot symbols.

11. The method of claim 1, wherein the constant is equal to approximately 0.5.

12. A method comprising:
accumulating pilot symbols of a first wireless signal;
accumulating non-pilot symbols of the first wireless signal;
generating a weight factor using an algorithm, the weight factor comprising a number of pilot symbols in the accumulated pilot symbols multiplied by a constant; and
calculating a weighted sum of the accumulated pilot symbols and the accumulated non-pilot symbols using the generated weight factor to estimate power of the first wireless signal.

13. The method of claim 1, wherein accumulating non-pilot symbols of the first wireless signal comprises separately accumulating a first number of non-pilot symbols corresponding to a slot and accumulating a second number of non-pilot symbols corresponding to the slot.

14. The method of claim 13, wherein accumulating the first number of non-pilot symbols corresponding to the slot comprises coherently accumulating the first number of non-pilot symbols corresponding to the slot, and wherein accumulating the second number of non-pilot symbols corresponding to the slot comprises non-coherently accumulating the second number of non-pilot symbols corresponding to the slot.

15. A computer-readable medium carrying program code that when executed,
accumulates pilot symbols of a first wireless signal;
accumulates non-pilot symbols of the first wireless signal;
selects a weight factor from a lookup table, the weight factor comprising a number of pilot symbols in the accumulated pilot symbols multiplied by a constant; and
calculates a weighted sum of the accumulated pilot symbols and the accumulated non-pilot symbols to estimate power of the first wireless signal.

16. The computer readable medium of claim 15, wherein the program code when executed:
accumulates pilot symbols by coherently accumulating a number of pilot symbols corresponding to a slot by summing each of the number of pilot symbols and squaring the sum of the number of pilot symbols, and
accumulates non-pilot symbols by non-coherently accumulating a number of non-pilot symbols corresponding to a slot by squaring each of the number of non-pilot symbols and summing the squares of the number of non-pilot symbols.

17. An apparatus comprising:
a receiver that receives a wireless signal,
a demodulator that demodulates individual chips of the wireless signal,
a symbol generator that groups results of the demodulation into control symbols, wherein the control symbols include pilot symbols and non-pilot symbols,
an estimator that calculates an estimate of the power of the wireless signal by separately accumulating the pilot symbols and the non-pilot symbols and calculating a weighted sum of the accumulated pilot symbols and accumulated non-pilot symbols using a weight factor comprising a number of pilot symbols in the accumulated pilot symbols multiplied by a constant,
an antenna coupled to the receiver,
a rotator that adjusts the frequency of the wireless signal prior to demodulation, and
a digital signal processor that processes the control signals.

18. An apparatus comprising:
a receiver that receives a wireless signal,
a demodulator that demodulates individual chips of the wireless signal,
a symbol generator that groups results of the demodulation into control symbols, wherein the control symbols include pilot symbols and non-pilot symbols,
an estimator that calculates an estimate of the power of the wireless signal by separately accumulating the pilot symbols and the non-pilot symbols and calculating a weighted sum of the accumulated pilot symbols and accumulated non-pilot symbols using a weight factor comprising a number of pilot symbols in the accumulated pilot symbols multiplied by a constant,
a comparator that compares the estimate to a target value to determine whether the power of the wireless signal should be increased or decreased, and
a power command generator that generates a command signal to adjust the power of the wireless signal.

19. The apparatus of claim 18, further comprising a transmitter that transmits a second signal to instruct a device that sent the first signal to adjust its power according to the command signal.

20. An apparatus that forms part of a base station in a wireless communication system comprising:
a receiver that receives a wireless signal,
a demodulator that demodulates individual chips of the wireless signal,
a symbol generator that groups results of the demodulation into control symbols, wherein the control symbols include pilot symbols and non-pilot symbols,
an estimator that calculates an estimate of the power of the wireless signal by separately accumulating the pilot symbols and the non-pilot symbols and calculating a weighted sum of the accumulated pilot symbols and accumulated non-pilot symbols using a weight factor comprising a number of pilot symbols in the accumulated pilot symbols multiplied by a constant.

21. The apparatus of claim 17, wherein the apparatus forms part of a wireless communication device in a wireless communication system.

22. The apparatus of claim 17, further comprising:
a number demodulators that demodulate individual chips of the wireless signal received via a number of paths,
a number of symbols generators that group results of demodulations into control symbols, wherein the control symbols include pilot symbols and non-pilot symbols, and
a number of estimators that respectively calculate estimates of the power of the wireless signal corresponding to each of the number of paths by accumulating the pilot symbols.

23. The apparatus of claim 22, further comprising:
a register that stores and combines the estimates; and
a comparator that compares the combined estimates to a target value to determine whether the power of the wireless signal should be increased or decreased.

24. A wireless communication system comprising:
a wireless communication device that sends a first signal encoded with pilot and non-pilot symbols; and
a base station that receives the first signal, and estimates power of the first signal by separately accumulating the pilot symbols and the non-pilot symbols and calculating a weighted sum of the accumulated pilot and non-pilot symbols, including selecting a weight factor from a lookup table, the weight factor comprising a number of pilot symbols in the accumulated pilot symbols multiplied by a constant.

25. The wireless communication system of claim 24, wherein the base station compares the estimated power of the first signal to a target value and sends a second signal back to the wireless communication device to adjust transmit power of the wireless communication device accordingly.

26. A wireless communication system comprising:

a base station that sends a first signal encoded with pilot and non-pilot symbols; and a wireless communication device that receives the first signal, and estimates power of the first signal by separately accumulating the pilot symbols and the non-pilot symbols and calculating a weighted sum of the accumulated pilot and non-pilot symbols, including selecting a weight factor from a lookup table, the weight factor comprising a number of pilot symbols in the accumulated pilot symbols multiplied by a constant.

27. The wireless communication system of claim 26, wherein the wireless communication device compares the estimated power of the first signal to a target value and sends a second signal back to the base station to adjust transmit power of the base station accordingly.

28. A computer-readable medium carrying program code that when executed, accumulates pilot symbols of a first wireless signal;

accumulates non-pilot symbols of the first wireless signal;

generates a weight factor using an algorithm, the weight factor comprising a number of pilot symbols in the accumulated pilot symbols multiplied by a constant; and calculates a weighted sum of the accumulated pilot symbols and the accumulated non-pilot symbols to estimate power of the first wireless signal.

29. A wireless communication system comprising:

a wireless communication device that sends a signal encoded with pilot and non-pilot symbols; and a base station that receives the signal, and estimates power of the signal by separately accumulating the pilot symbols and the non-pilot symbols and calculating a weighted sum of the accumulated pilot and non-pilot symbols, including generating a weight factor using an algorithm, the weight factor comprising a number of pilot symbols in the accumulated pilot symbols multiplied by a constant.

30. A wireless communication system comprising:

a base station that sends a signal encoded with pilot and non-pilot symbols; and a wireless communication device that receives the signal, and estimates power of the signal by separately accumulating the pilot symbols and the non-pilot symbols and calculating a weighted sum of the accumulated pilot and non-pilot symbols, including generating a weight factor using an algorithm, the weight factor comprising a number of pilot symbols in the accumulated pilot symbols multiplied by a constant.

* * * * *